No. 875,514.  
PATENTED DEC. 31, 1907.  
B. FRANCISCO.  
MACHINE FOR DESTROYING GRASSHOPPERS.  
APPLICATION FILED JAN. 11, 1907.
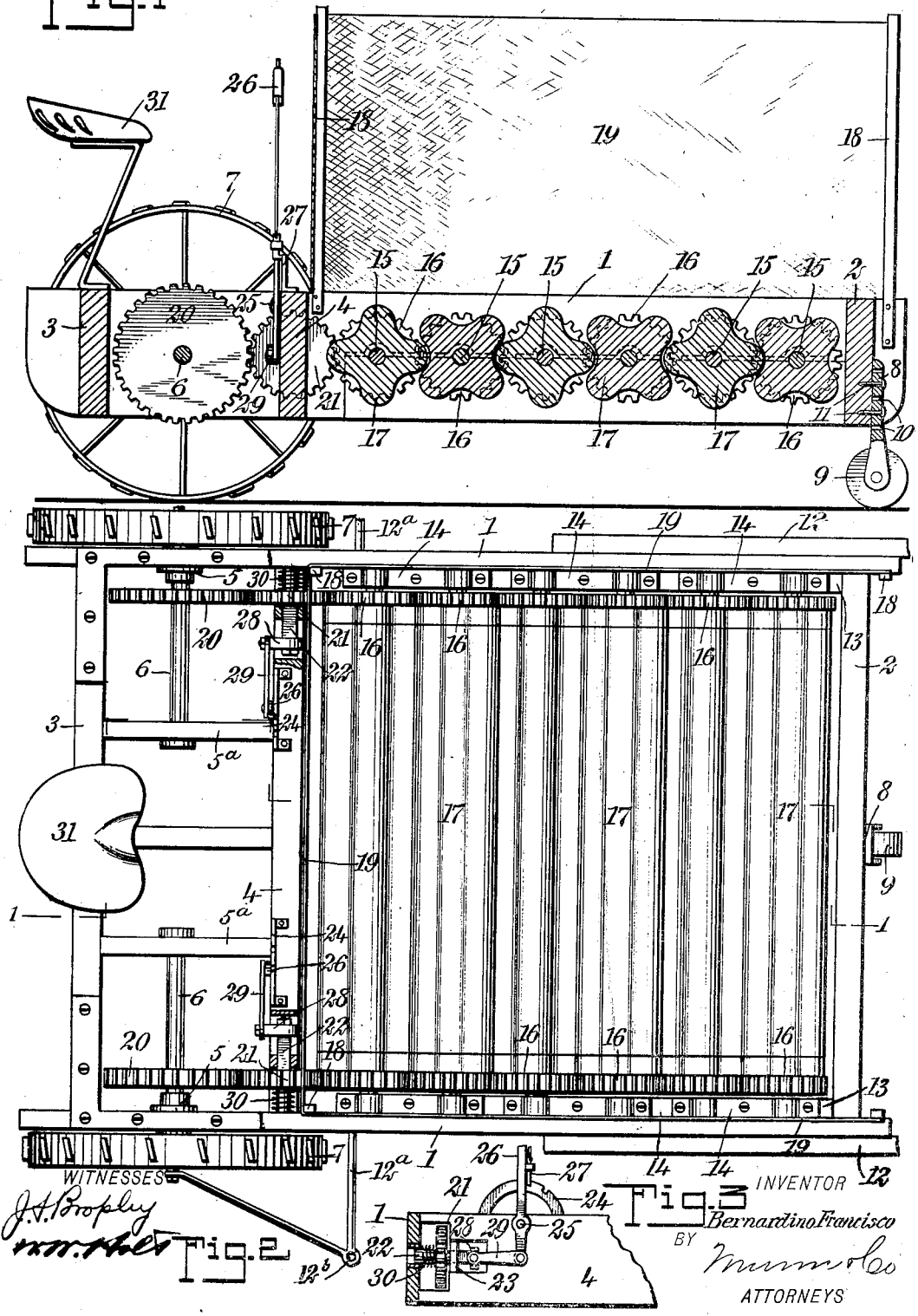
INVENTOR  
Bernardino Francisco  
BY  
ATTORNEYS

UNITED STATES PATENT OFFICE.

BERNARDINO FRANCISCO, OF PENABLANCA, TERRITORY OF NEW MEXICO.

MACHINE FOR DESTROYING GRASSHOPPERS.

No. 875,514.

Specification of Letters Patent.

Patented Dec. 31, 1907.

Application filed January 11, 1907. Serial No. 351,811.

*To all whom it may concern:*

Be it known that I, BERNARDINO FRANCISCO, a citizen of the United States, and a resident of Penablanca, in the county of Sandoval and Territory of New Mexico, have invented a new and Improved Machine for Destroying Grasshoppers, of which the following is a full, clear, and exact description.

This invention is an improved machine for destroying grasshoppers and like insects, designed to frighten them from the grass, alfalfa, etc. and crush them with rapidity.

The invention embodies in its construction a frame preferably of considerable width and length, in which is journaled a pair of closely adjacent or intermeshing rolls, the latter being rapidly driven from wheels supporting the frame, as the machine is drawn over the ground. The grasshoppers, on flying or jumping from the grass, etc. as the machine passes over them, contact with the rapidly-revolving rolls and are thus destroyed. Provision is also made for collecting a large proportion of the insects flying above the rolls and bringing them in contact therewith from the sides of the machine.

Reference is to be had to the accompanying drawings forming a part of this specification, in which similar characters of reference indicate corresponding parts in all the figures.

Figure 1 is a central, longitudinal, vertical section, on the line 1—1 of Fig. 2, of one embodiment of my improved machine; Fig. 2 is a plan of the machine partly in section; and Fig. 3 is a fragmentary detail view of the means employed in throwing the lacerating rolls out of gear.

In the preferred construction of my improved grasshopper destroyer, I employ a frame composed of side sills 1 joined together by cross sills 2 and 3 arranged respectively at the front and rear ends of the machine. Also joining the sills 1 together, is an intermediate cross sill 4, spaced a slight distance from the sill 3, the dimensions of said sills being such as to provide a frame that will cover a considerable area.

Journaled in bearings 5 fixed in the side sills 1 between the cross sills 3 and 4 and in cross pieces 5ª, are short shafts or stub axles 6, one at each side of the machine and each having fixed to its outer end at the outside of the sills 1, a wheel 7 of the usual harvester and reaper type. At the center of the front sill 2 is a post 8 having a forked lower end, in which is journaled a single wheel 9. This post is made adjustable to support the frame at different distances from the ground, by means of a series of openings 10 through which pass screws 11 rigidly connecting said post and the sill 2 together. At the forward end of the machine frame a tongue 12 is attached to each of the side sills 1; these tongues in connection with the brackets 12ª are for hitching suitable draft animals in drawing the machine over the ground. Each of the brackets 12ª as shown in Fig. 2 comprises a member attached to the adjacent sill 1 and braced at its end by a diagonal bar or member attached to the outer end of the adjacent axle 6, an aperture 12ᵇ being provided at the junction of these members for receiving the usual swingletree.

Secured to the inner face of each of the side sills 1 between the cross sills 2 and 4, are boards 13 providing a shoulder about midway of the width of the said sills on which bearings 14 are carried. In these bearings are journaled shafts 15 to which are fixed at both sides of the machine, intermeshing gears 16 acting to positively drive a train of intermeshing rolls 17 also fixed to said shafts. These rolls are preferably constructed of wood or other material, and are each formed with large teeth or corrugations, which better adapt them to entrap the grasshopper or other insect as the rolls revolve.

Secured at each corner above the rolls to the side sills 1, is a standard 18 to which a wide strip of canvas or other material 19 is secured, forming a wall at each side and at the rear end above said rolls, but leaving the forward end of the machine open. This wall collects a large proportion of the insects flying above the rolls as the machine moves forward and forces them into contact therewith from the sides of the machine.

At each side of the machine the following mechanism is provided for positively driving the rolls 17 and throwing them into and out of action. A large gear 20 is fixed to the short or stub shaft 6 and mashes with a gear 21, which in turn meshes with the gear 16 fixed to the rear shaft 15. The gear 21 is journaled on a longitudinally movable spindle 22, but is prevented from sidewise movement thereon in any suitable manner. As shown in Fig. 3, the spindle 22 is provided with a bearing in the adjacent side sill 1 and also a bearing 23 arranged in a suitable opening in the cross sill 4, said opening being of sufficient extent to provide clearance for both the spindle and attached gear. On the upper edge of the cross sill 4 is fixed a notched arc 24 concentrically arranged with the pivot of a hand lever 26, the latter carrying a spring-pressed bolt 27 for engaging with the notches in the arc, and thus locking the lever in adjusted position. The lever 26 is extended below its pivot 25 where it is connected with an arm 28 projecting from the inner end of the spindle 22, through the intermediary of a link 29. A spring 30 surrounding the spindle 22 and interposed between the cross sill 1 and gear 21, normally retains said gear 21 in mesh with both the gear 20 and the adjacent gear 16. As is obvious from this construction, on withdrawing the bolts 27 and pulling the levers 26 to one side to engage said bolts with the next adjacent notch in the arcs 24, the springs 30 will be compressed and the gears 21 will be shifted to disengage from the adjacent gearing, thereby throwing the crushing or mashing rolls 17 out of action while the machine is in motion. Fixed to the cross sill 3 is a seat 31 arranged within a convenient reach of the levers 26, whereby the latter may be controlled by the driver without shifting his position.

In the operation of the machine, as it is drawn forward the rolls are positively and rapidly driven by the intermeshing gearing and act to crush or mash the grasshoppers or other insects as they contact therewith.

Although I have described the invention in detail in order that the construction may be fully understood, it is obvious that various immaterial changes may be made in the construction of the same, falling within the scope of the annexed claims.

Having thus described my invention, I claim as new and desire to secure by Letters Patent:

1. An insect destroyer comprising a frame, a series of corrugated, intermeshing, crushing rolls journaled crosswise of the frame, intermeshing gears in fixed relation to said rolls, an axle journaled in the frame having a wheel fixed thereto for supporting the same, a gear fixed to the axle, a gear intermeshing with the gear fixed to the axle and one of said intermeshing gears, and a hand lever operable to shift said last-named gear, whereby said rolls are thrown out of action.

2. An insect destroyer comprising a frame, a series of closely adjacent rolls journaled crosswise of the frame, intermeshing gears in fixed relation to said rolls, an axle journaled in the frame, having a wheel fixed to one end thereof for supporting the frame, a gear fixed to the axle, an intermediate gear adapted to mesh with the gear fixed to the axle and one of said intermeshing gears, a seat fixed to the frame, and a hand lever carried by the frame adjacent to said seat, operable to shift said intermediate gear sidewise, whereby said rolls are thrown out of action.

In testimony whereof I have signed my name to this specification in the presence of two subscribing witnesses.

BERNARDINO FRANCISCO.

Witnesses:
   ALBERT DAEGER,
   ARBOGAST REISLER.